Sept. 21, 1937.  O. B. BOYER  2,093,801
HYDRAULIC STEERING APPARATUS
Filed April 13, 1935
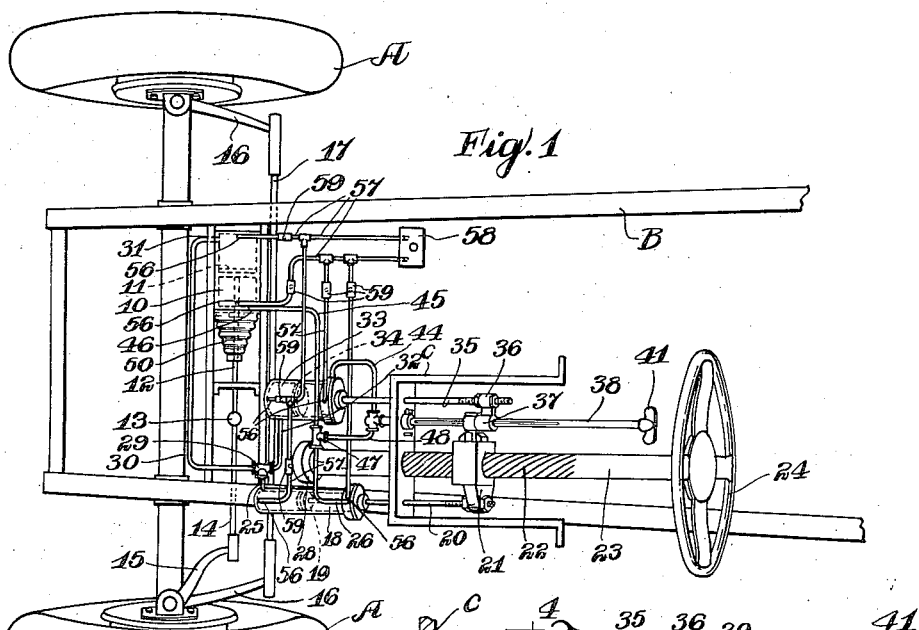
Fig. 1
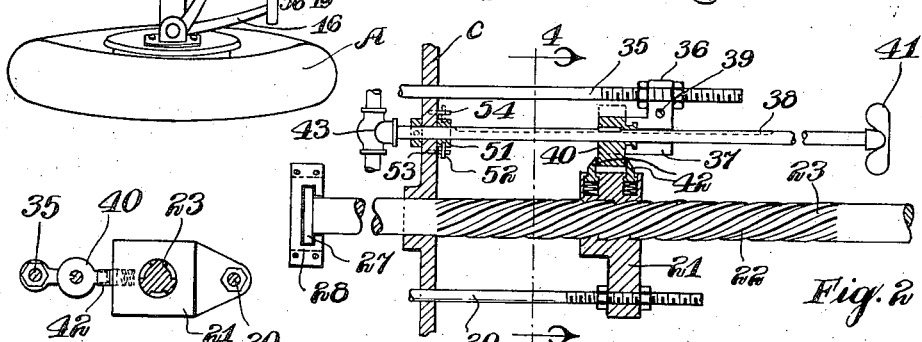
Fig. 2
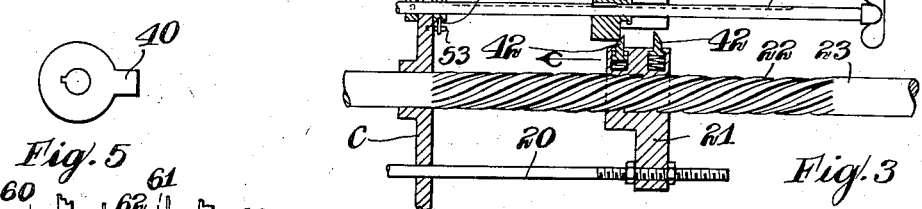
Fig. 3
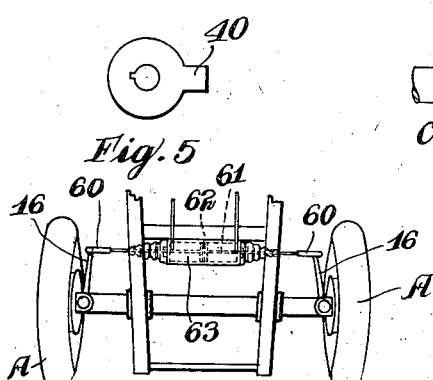
Fig. 4
Fig. 5
Fig. 6
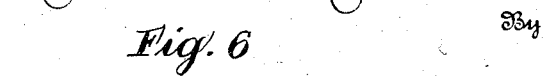
Inventor
Orren B. Boyer
By
Attorney Patented Sept. 21, 1937

2,093,801

UNITED STATES PATENT OFFICE 2,093,801

HYDRAULIC STEERING APPARATUS

Orren B. Boyer, Fargo, N. Dak.

Application April 13, 1935, Serial No. 16,197

12 Claims. (Cl. 280—87)

My invention relates to a hydraulic steering apparatus designed to operate the steering wheels of a motor vehicle by hydraulic pressure. The hydraulic pressure is created by a steering wheel which the driver engages and rotates in a direction to steer the motor vehicle.

A feature of my hydraulic steering apparatus resides in a greater leverage being applied to the steering apparatus, for operating the steering wheels of automobiles, trucks, busses or other motor vehicles when it is desired.

A further feature of this hydraulic steering apparatus resides in the means of selecting a different ratio by the driver. I have provided a simple means whereby the driver may readily change the ratio of operation upon the master cylinder which operates the steering wheels This permits a faster operation when it is desired, and a greater leverage when more power is desired for the driver on the steering wheels. Thus the driver may select the steering ratio at will which is a material advantage over other types of steering apparatus.

The low ratio of my hydraulic steering apparatus may be used for highway or fast driving, and the high ratio for city driving where it is desirable to have a greater force for operating the steering wheels.

With my hydraulic steering apparatus it may be built into the car at any desired angle and the position or adjustment of the steering column and wheel may be changed readily if it is desired. Further with this steering apparatus it will be easier to carry out the desired streamlining styles of automobile bodies because this steering apparatus may be built in more easily and without interfering with the design or style of the body.

It is also a feature to provide a master operating cylinder for the steering wheels of a motor vehicle, which is connected to the same so as to operate the wheels readily when the driver of the motor vehicle operates his steering wheel, the rotation of the driver's steering wheel causing fluid pressure to be extended to either side of the piston of the master cylinder to operate the same.

These features, together with other details and objects will be more fully and clearly pointed out in the specification and claims.

In the drawing forming part of this specification:

Figure 1 is a plan view of a portion of the chassis of an automobile, diagrammatically illustrating my hydraulic steering apparatus, as applied to an automobile steering wheel.

Figure 2 is a sectional detail of a portion of my hydraulic steering apparatus.

Figure 3 is a section similar to Figure 2, illustrating the parts in a different position.

Figure 4 is a section on the line 4—4 of Figure 2.

Figure 5 is an enlarged detail of a portion of the steering apparatus.

Figure 6 illustrates an alternative form of connecting mechanism for the front wheels.

My hydraulic steering apparatus is diagrammatically illustrated in Figure 1 as it would appear connected to the steering wheels A of a motor vehicle. The apparatus consists of a master cylinder 10 which is provided with a piston 11. The piston 11 is connected by the rod 12 to the ball joint 13 which in turn connects with the link 14 in a manner to connect the rod 12 with the steering arm 15 of one of the wheels A.

The wheels A are connected by the arms 16 and the link 17 so that they will operate in unison to move in the same direction to steer the motor vehicle B, only a portion of which is shown, such as the frame. The master cylinder 10 is adapted to be operated by the small primary cylinder 18 which is provided with a piston 19 and a piston rod 20. The rod 20 is connected to the crosshead 21 which is carried on the threaded portion 22 of the steering column 23. The steering column 23 is adapted to be rotated by the driver's steering wheel 24.

Thus when the driver's steering wheel 24 is rotated the steering column 23 is rotated, causing the threads 22 to move the cross-head 21 along the steering column 23 in the desired direction. It will therefore be apparent that if the steering column 23 is rotated in one direction, the cross-head 21 will move in one direction along the threads 22, whereas, if the steering wheel 24 is moved in the opposite direction, the cross-head 21 will move in the opposite direction, thereby carrying the cross-head longitudinally of the steering column 23 and in turn operating the piston rod 20 causing the piston 19 to force the liquid within the same either out of the pipe 25, which leads from one end of the cylinder, or out of the pipe 26, which leads from the other end of the cylinder, in accordance with the movement of the piston 19.

The steering column 23 has an enlarged shoulder end 27 formed on one end which is held in the bearing 28. The bearing 28 may provide a suitable friction or tension to assist in holding the steering column 23 in a set position as operated by the driver's steering wheel 24.

The pipe 25 is connected by the T-connector 29 to the pipe 30 which connects at one end 31 of the master cylinder 10. The T 29 also connects one end of the cylinder 18 by the pipe 32 to one end of a secondary cylinder 33 which is larger in diameter than the cylinder 18. The secondary cylinder 33 has a piston 34 within the same. A piston rod 35 extends from the piston 34 through the brace C and is adjustably connected to the member 36. It is also apparent that the rod 20 is adjustably connected to the cross-head 21.

The member 36 is provided with a collar 37 which extends around the operating rod 38. The member 36 is split and is adapted to be held together by the bolt 39 so that a connecting key 40 is rotatably secured to the collar portion 37, as illustrated in Figure 2. The key 40 is feather-keyed to the operating rod 38 so that it can slide along the rod 38 and be operated by the handle portion 41 which rotates the rod 38 to turn the key 40 into and out of operating position so as to engage between the spring dogs 42 which are carried by one side of the cross-head 21.

The operating rod 38 extends through the brace C and is adapted to operate a valve 43. This valve 43 is in the pipe line 44 which connects with one end of the secondary cylinder 33, and with the pipe line 45 which connects one end of the cylinder 18 to the end of the master cylinder at the point 46 which is opposite to the end where the connecting point 31 is located of the pipe 30. The pipe 26 is connected by the T-connector 47 to the pipe 48 which connects with the valve 43 and which also connects to the pipe 45.

The diagrammatic sectional illustration in Figure 2, shows the key 40 positioned between the spring dogs 42, and in this position the rod 38 has been rotated by the handle 41 so as to open the valve 43. Then when the driver's steering wheel 24 is turned, with the key 40 in the position illustrated in Figure 2, the cross-head 21 will move the rods 20 and 35 so as to operate the pistons 19 and 34 in the primary cylinder 18 and the secondary cylinder 33, and the fluid in the connecting pipe from the primary and secondary cylinders will be caused to act upon the piston 11 to move the same in a direction to steer the wheels A as desired by the driver. Thus if the driver's wheel 24 is turned toward the right, the master cylinder 10 will be operated to steer the wheels A toward the right, whereas, if the driver's wheel 24 is turned toward the left, the master cylinder 10 will operate to steer the wheels toward the left. with the primary and secondary cylinders 18 and 33 operated together in the manner just described, the ratio between the driver's steering wheel 24 and the master cylinder 10 is changed so as to operate the steering wheels quickly with a small turning movement of the driver's wheel 24, whereas, when the primary cylinder 18 is operating alone by the cross-head 21 and the rotation of the driver's steering wheel 24, when the key 40 is released from the dogs 42 and the valve 43 is closed, then the driver's steering wheel 24 must be rotated farther to turn the wheels A the same distance that they would have been turned by a lesser turning movement of the driver's wheel 24.

It will therefore be apparent that I have provided a selector means for changing the ratio between the driver's steering wheel 24 and the operating master cylinder 10 which is manually operated by the handle portion 41 whenever the driver desires to change the ratio of the steering mechanism. This selector means permits the driver to quickly change the ratio between the steering wheels when it is desired by operating the handle 41.

In Figure 3 I have illustrated diagrammatically the manner in which the spring dogs 42 may operate to engage with the key 40 when the steering column 23 is rotated, forcing the cross-head 21 in the direction of the arrow, and permitting the key 40 to be positioned between the spring dogs 42. In this figure, one of the spring dogs 42 is being depressed by reason of the downward movement of the cross-head 21 as indicated by the arrow. The spring dogs 42 are beveled so that they will depress in either direction of the movement of the key 40, and thus the driver may conveniently move the cross-head 21 to engage the key 40 by operating the steering wheel 24 even though the key 40 is not directly positioned opposite the opening between the two dogs 42 when the operator turns the rod 38 into position to be in line with the cam ends of the dogs 42.

I provide a suitable leather or other form of bellows 50 for the rod 12 so as to protect the working portion of the rod 12 against dirt or grit which might otherwise affect the packing gland through which the rod 12 operates in the end of the cylinder 10.

I also provide a collar 51 on the rod 38 which carries a stop pin 52 which engages against either the stop pin 53 or 54 carried by the brace C to limit the turning movement of the rod 38.

My motor vehicle steering device is of a simple character, having hydraulic means for operating the steering wheels of a motor vehicle with variable ratios between the driver's steering wheel and the steering wheels, and a selector means which permits the ratio to be changed at will by the driver. There are times in driving a motor vehicle when it is desired to steer the front or steering wheels with more leverage and this is readily accomplished with my steering device by using the primary cylinder 18 alone to operate the master cylinder 10. The selector means easily permits the driver to select the primary cylinder 18 as a means of operating the master cylinder 10 and with the same selector means the driver can readily throw into operation the secondary cylinder 33, to change the ratio in the steering device. It is therefore apparent that a motor vehicle may be more easily steered with my selective hydraulic steering device, and the responsive nature of this hydraulic means between the driver's steering wheel 24 and the steering wheels interposes a hydraulic cushion in the steering mechanism, giving a similar advantage as is found in hydraulic brakes which overcome the rigid mechanical structure and connection of parts to give a smoother operation in the steering mechanism. It is apparent that the ratio means may be varied so that the selector may be operated to give the desired ratio between the driver's operating steering wheel 24 and the steering wheels A, and it is apparent that one or more auxiliary operating cylinder means may be provided even though I have shown only the primary and secondary operating cylinders in their present relation and difference in capacity. It is also apparent that the means of operation may be varied and the selector means may be of other form, all of which would come within the scope of the appending claims and such variations as would be apparent to those skilled in the art.

The valve means which are provided, such as 43, keeps the piston 34 in the position in which it is left when the selector means 38 and operating handle 41 release the key 40 from the engaging dogs 42. Thus the piston 34 in the cylinder 33 will not be affected when the valve 43 is closed by the operation of the primary cylinder 18.

In order that the system of cylinders be kept completely filled with liquid at all times, I provide an inlet for liquid, 56, at each end of each cylinder. Each of these inlets is connected by means of pipes 57 to a reservoir 58 or tank in which additional liquid is maintained. A check valve 59 in each of the pipes 57 from each end of each cylinder prevents pressure from being transmitted from one cylinder to another. Liquid may be permitted to seep into the system to keep the system full at all times, but no liquid may be forced into the tank or reservoir 58.

In Figure 6 I illustrate a cylinder interposed in the connecting means between the two wheels. The arms 16 for steering the wheels A are connected by links 60 to the piston rod 61 on the piston 62 in the cylinder 63. The connections between the piston rod 61 and the links 60; and between the piston rod 61 and the arms 16 are universal connections. In this construction the tie rod, directly connecting the arms 16, is eliminated.

I claim:

1. A hydraulic steering device including a master cylinder having a piston, means connecting said piston to the steering wheels of a motor vehicle to cause the tie rod to move said steering wheels in a manner to steer the motor vehicle, a driver's steering wheel, a plurality of adjustable hydraulic cylinder means operable by said driver's steering wheel and means for connecting and disconnecting part of said hydraulic cylinder means to cause operation thereof singly or in unison to operate said master cylinder with different ratios of operation.

2. A steering device including a driver's steering wheel located within an automobile, a steering column having long spiral threads, a crosshead carried on said threads, a pair of hydraulic cylinders having pistons therein, one of said cylinders having a larger diameter than the other, said pistons in said cylinders being adapted to force with pressure a fluid within said cylinders in either direction of movement of said piston, means connecting and disconnecting one of said cylinders, connecting rods from said pistons operable by the operation of said threaded steering column, means connecting said rods with said cross-head operated by the rotation of said steering column, and a master cylinder having its ends selectively connected to said cylinders and operated by pressure therefrom, and means connecting the piston of said master cylinder to operate the steering wheels of an automobile by fluid pressure set up by the rotation of the driver's steering wheel within the automobile.

3. A hydraulic steering device for automobiles and the like, including a master cylinder, a piston within said cylinder, means connecting said piston with the steering wheels of an automobile, a small hydraulic cylinder, a larger auxiliary hydraulic cylinder, an operator's steering wheel, pistons within said small and auxiliary cylinders, means for connecting the piston of said small cylinder in a manner to be operated by the rotation of the driver's steering wheel, and selective means for connecting the piston of said auxiliary cylinder to connect and disconnect said auxiliary cylinder with the operation of said driver's steering wheel, said small cylinder and said auxiliary cylinder being connected with either end of said master cylinder to operate the steering wheels of the automobile by hydraulic pressure.

4. A hydraulic steering device comprising a hydraulic master cylinder having means connecting with the steering wheels of an automobile to operate the steering wheels by the movement of the piston in said master cylinder, a primary operating hydraulic cylinder for said master cylinder, an auxiliary hydraulic operating cylinder associated with said primary cylinder, said primary and said auxiliary cylinders having their ends connected by suitable passageways to either end of said master hydraulic cylinder, a driver's steering wheel, means connecting said primary cylinder to operate the same in a manner to control the operation of said master cylinder, and selector means for placing said auxiliary cylinder in circuits with said primary cylinder, so that said primary cylinder and said auxiliary cylinder will operate together by the operation of the driver's steering wheel, whereby said master cylinder is caused to operate by said primary cylinder alone or by said primary and secondary cylinder operating together to operate said master cylinder at different ratios with the operation of said driver's steering wheel.

5. A hydraulic steering apparatus for automobiles and the like, including a driver's steering operating wheel, a primary and secondary hydraulic cylinder each having pistons adapted to force fluid from either end of said cylinders, means connecting the piston of said primary cylinder to operate at all times with the operation of said driver's steering wheel, selective means for connecting the piston of said secondary cylinder with the operating means of said driver's steering wheel including means for disconnecting said secondary cylinder from said primary cylinder, a master cylinder having a piston adapted to be operated by said primary and said secondary cylinders, a circuit of passageways connecting the ends of said primary and secondary cylinders with the ends of said master cylinder, means connecting the piston of said master cylinder to the steering wheels of the automobile.

6. A steering device for motor vehicles including, a driver's steering wheel, hydraulic cylinder means having piston means therein a hydraulic master cylinder having a piston, means connecting said master cylinder piston to the steering wheels of the motor vehicle, passageways connecting the ends of said hydraulic cylinder means with the ends of said hydraulic master cylinder, and means for connecting and disconnecting the passageway from one of said hydraulic cylinder means, whereby the rotation of the driver's steering wheel will operate said master cylinder in a manner to steer the wheels of the motor vehicle with a faster or slower ratio between said driver's steering wheel and said master cylinder.

7. A steering device for motor vehicles including hydraulic cylinder means, a piston within said master cylinder connected to the steering wheels of the motor vehicle, hydraulic cylinder means connected to the ends of said master cylinder by a circuit of passageways, means for connecting said last hydraulic cylinder means with the driver's steering wheel in the motor vehicle, and means for changing the ratio of operation between said hydraulic cylinders and said master cylinder at the will of the driver to provide a faster or slower operation of the steering wheels by said master cylinder.

8. A hydraulic steering device for motor vehicles including a driver's operating wheel, a pair of cylinders, pistons within said cylinders, piston rods extending out of said cylinders, means connecting said cylinders selectively to be operated by the rotation of said driver's steering wheel, a master cylinder, a piston within said master cylinder, means connecting said piston in said master cylinder with the steering wheels of the motor vehicle, pipes connecting the ends of said master cylinder with the ends of said first named cylinders, and valve means for shutting off the pipe to one of said first named cylinders when the other of said cylinders is in operation for a certain predetermined ratio of operation between said driver's steering wheel and said master cylinder and for opening the pipe to the said cylinder to place it in circuit with the other of said first named cylinders, whereby to give a different ratio of operation between said driver's steering wheel and said master cylinder.

9. A hydraulic operating means for steering wheels of a motor vehicle including cylinder means having a piston connected to the steering wheels of the motor vehicle, a driver's steering device in the motor vehicle, and a variable ratio, hydraulic plunger means for operating the cylinder connected to the steering wheels with a variable distance for a constant movement of the driver's steering device.

10. In combination with a vehicle having steering wheels and a driver's steering device; a hydraulically actuated device secured to said steering wheels for operating the same, a hydraulic device operated by said driver's steering device, means connecting said last named hydraulic device to said first named hydraulic device for transmitting pressure from said last named device to said first named device, a third hydraulic device, means selectively connecting said third hydraulic device to said first named hydraulically actuated device, and means connecting said third hydraulic device for actuation by said driver's steering device.

11. A steering device for motor vehicles including a driver's steering operating member, continuously connected means providing continuous control between said operating member and the vehicle steering wheels for operating the steering wheels by hydraulic pressure, means imposed between said operating member and the steering wheels while maintaining said first named means connected for varying the ratio of operating leverage between the driver's steering operating member and the steering wheels of the motor vehicle, and selector means for operating said ratio varying means.

12. A steering device for motor vehicles including continuously connected means for operating the steering wheels by hydraulic pressure, a driver's steering device in the motor vehicle, said operating means providing a continuous control between the steering wheels and said driver's steering device, and a ratio selector operable while maintaining said first named means connected interposed between the driver's steering device and the steering wheels of the motor vehicle in the hydraulic operating means to vary the ratio of operation between the steering wheels and the driver's steering device while said control remains continuous.

ORREN B. BOYER.